Oct. 9, 1928.

H. A. HOUSTON

GUIDE TRUCK

Filed Oct. 16, 1925

WITNESSES:

INVENTOR
Harold A. Houston.
BY
ATTORNEY

Oct. 9, 1928.
H. A. HOUSTON
1,686,664
GUIDE TRUCK
Filed Oct. 16, 1925
2 Sheets-Sheet 2
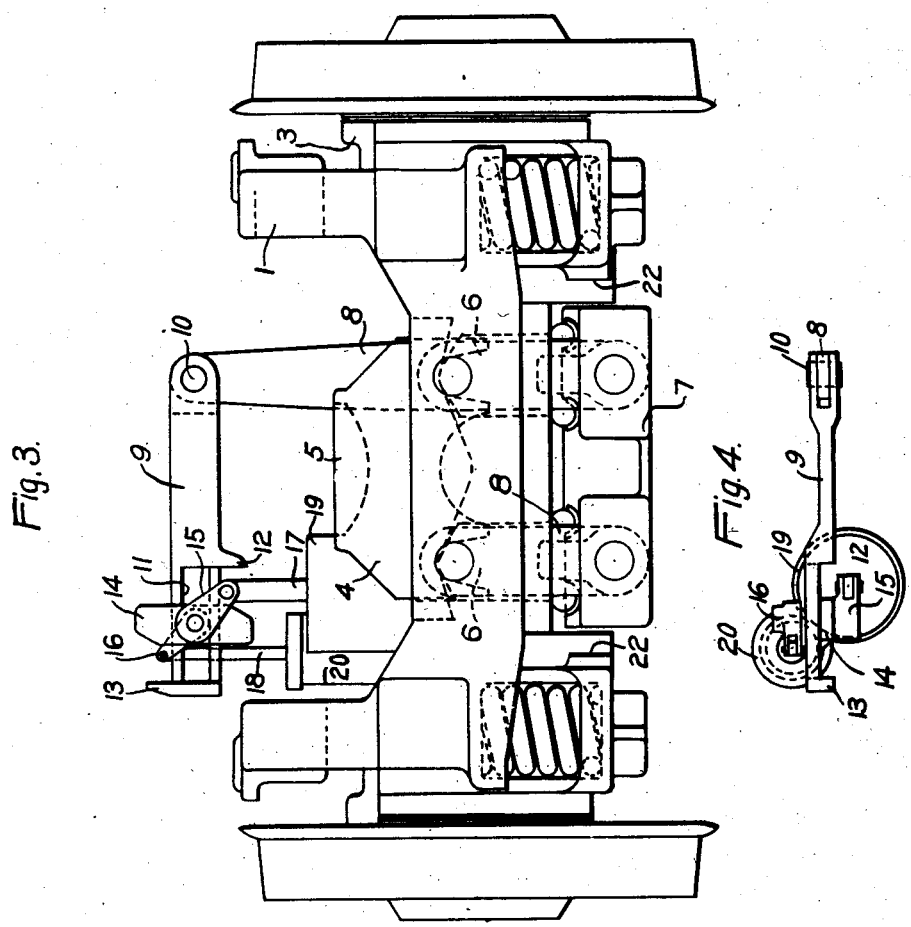
WITNESSES:
INVENTOR
Harold A. Houston.
BY
Wesley G. Carr
ATTORNEY Patented Oct. 9, 1928.

1,686,664

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

GUIDE TRUCK.

Application filed October 16, 1925. Serial No. 62,754.

My invention relates to guide trucks, more particularly to a locking mechanism for regulating the degree of swinging movement of truck bolsters upon which a portion of the weight of a vehicle is loaded by a center-pin connection.

It is among the objects of my invention to provide a guide truck having a swing-bolster arrangement which shall permit a relatively large amount of lateral motion beyond the movement that is normally restricted by the frame portions of the truck member.

Another object of my invention is to provide a truck construction of the above-designated character having a novel arrangement of swing link members and compression cams and which shall embody means for restraining or regulating the movement of such link members for the purpose of controlling the degree of lateral swinging movement of the bolster member.

Another object of my invention is to provide a guide truck of simple, compact and durable mechanical construction which shall be efficient in its operation of steering the vehicle with which it is associated to guide the same relative to the curvature of the rails.

Various types of steering or guide truck structures have been proposed which are designed to produce a positive steering action when in a leading position relative to the direction of motion of the vehicle and which shall be free from restraint to permit an idle trailing action when the vehicle operates in the reverse direction.

For this purpose, various mechanical control and regulating devices have been designed and various means for operating the same have been proposed, some of which comprise an automatic or semi-automatic control system, while others are manually operated through lever arrangements or fluid-pressure systems.

My present invention contemplates the embodiment of a mechanical, fluid-pressure-actuated lever arrangement which shall regulate the operating parts of guide truck structures to limit or restrain movement of the truck bolster relative to the truck frame.

In the accompanying drawings, constituting a part hereof, and in which like reference characters designate like parts, Figures 1 and 2 are views in longitudinal section of a guide truck, in a leading and trailing position, embodying the principles of my invention.

Fig. 3 is a view in end elevation thereof.

Fig. 4 is a top plan view of a part of the fluid presure-system embodying a plurality of piston members, and Fig. 5 is a view, partially in section and partially in elevation, of the elements shown in Fig. 3.

Figure 2:
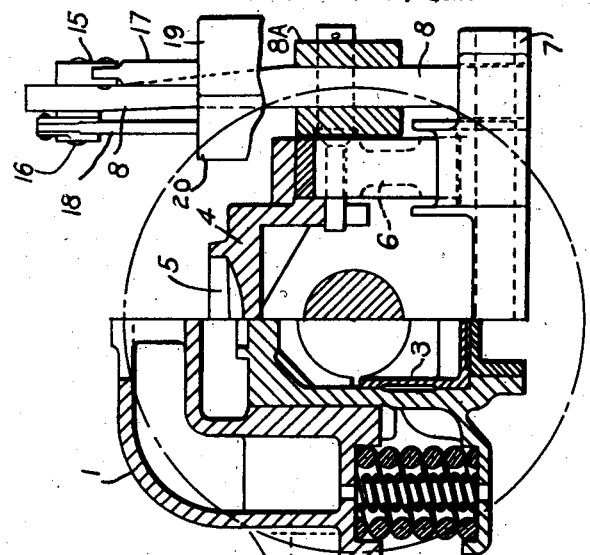
Figure 1:
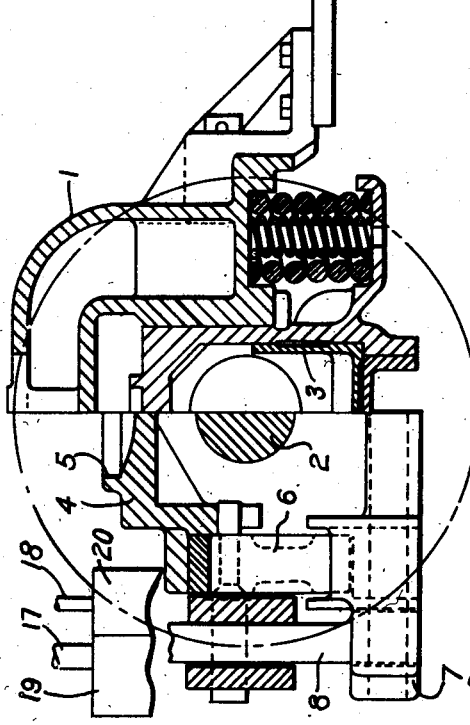

Referring to Figs. 1 and 2, the structure therein illustrated comprises a truck frame 1 that is journalled on a wheeled axle 2 by means of the usual journal box construction 3. A swing bolster 4, having a recessed portion 5 for receiving a center pin that is mounted on a vehicle body (not shown), is supported on a plurality of compression or cam links 6, which are seated on a movable support 7 that is suspended by a plurality of tension links 8 from the truck frame 1 at 8A.

One or all of the links 8 is provided with a shifting lever 9 that is secured by a pivot bolt 10 and disposed above and transversely of the bolster member. The lever 9 is provided with a slotted opening 11 and with a pair of offset portions or shoulders 12 and 13, which are best shown in Fig. 3. A key 14 is mounted for pivotal and sliding movement in the slot 11 of the lever 9 and is connected by a plurality of bell cranks 15 and 16 to piston rods 17 and 18, respectively. The corresponding pistons 17a and 18a operate in a pair of cylinders 19 and 20, which are secured in a suitable manner to a portion of the truck frame 1. The piston member 18a is biased by a coil spring 21, as shown in Fig. 4, to maintain the key 14 in a vertical position, thus permitting freedom of lateral motion of the lever 9, which permits a swinging movement of the tension links 8.

The cylinders 19 and 20 are connected to a fluid-pressure system or source (not shown), whereby the pistons may be actuated to rotate the key 14 for the purpose of releasing or locking the lever 9 to respectively permit freedom or to restrain the motion of the links 8. When the key 14 is in the vertical position shown in Figs. 2 and 4, the lever 9 is unlocked and is permitted to move transversely of the truck center line without restraint; and this open position of the key is maintained by the application of fluid pressure against the piston 18a, which must be sufficient to overcome the biasing effect of the spring member 21.

To lock the lever 9 against movement, the piston 17a is actuated and, upon the upstroke of the piston, the key 14 is rotated so that its longitudinal axis coincides with the longitudinal axis of the lever 9, in which position the latter is restrained against movement by virtue of its engagement with the members 12 and 13.

The operation of my device is briefly as follows: when the lever 9 is locked against movement, as previously explained, the tension links 8 are virtually locked to the truck frame 1 and the movable support 7 is thereby fixed or held stationary. In this condition the bloster member 4 is permitted to swing laterally upon the cam links 6 and the truck will operate as a leading truck having a positive steering characteristic.

When the truck is in a trailing position, the piston member 18a is actuated to bring the key 14 in the position shown in Figs. 2 and 4, which permits free movement of the lever 9 and, consequently, freedom of movement of the tension links 8. Under these conditions, the support member 7 may move transversely of the center line of the truck within the limits of the faces or pads 22 of the truck frame 1, and when the support has moved against either face and rests thereagainst, the bolster member 4 is permitted additional transverse movement upon the cam links 6 to the amount of movement normally permitted by the cam link support. Thus it is seen that the combination of cam and tension links permits movement in excess of the swinging motion permitted by the use of either the cam or tension type of links alone.

I have found, however, that means must be provided for restraining the amount of transverse movement of the bolster when a steering characteristic is needed; and to accomplish this object, I have provided the locking mechanism for locking the tension links to the truck frame and thereby restricting the swinging movement of the bolster to that attainable within the limits of the cam links.

It is evident from the foregoing description of my invention that guide trucks made in accordance therewith provide simple and efficient means for steering a vehicle over its supporting rails in accordance with variations in the tangency or curvature of the rail members and that such a device is susceptible of simple and compact design that lends itself to a durable mechanical construction.

Although I have described a specific embodiment of my invention, it will be obvious to those skilled in the art that various modifications may be made in the details of construction without departing from the principles herein set forth.

I claim as my invention:

1. In a railway vehicle guide truck, the combination with a truck frame, of a swing bolster, a movable support associated therewith, tension links pivoted to said frame and support, compression links disposed between said bolster and said support, and means for locking said support to said frame.

2. In a railway vehicle guide truck, the combination with a truck frame, of a swing bolster, a movable support associated therewith, tension links pivoted to said frame and support, compression links disposed between said bolster and said support, and means for locking said tension links in a vertical position.

3. In a railway vehicle guide truck, the combination with a truck frame, of a movable support associated therewith, a swing bolster mounted on said support, means for providing lateral swinging movement of said support, means independent of the first-named means for providing lateral movement of said bolster, and means for locking said support with said truck frame.

4. In a railway vehicle guide truck, the combination with a truck frame, of a movable support associated therewith, a swing bolster mounted on said support, means for providing lateral swinging movement of said support, means independent of the first-named means providing lateral movement of said bolster, and means for locking said support against lateral movement with said truck frame.

5. In a railway vehicle guide truck, the combination with a truck frame of a movable support associated therewith, a swing bolster mounted on said support, means for providing lateral swinging movement of said support, means independent of the first-named means for providing lateral movement of said bolster, and means for locking said support against lateral movement with said truck frame, said locking means comprising a shift lever and a fluid-pressure-actuated member adapted for engagement with an offset portion of said shift lever.

6. In a railway vehicle guide truck, the combination with a truck frame, of a movable support associated therewith, a swing bolster mounted on said support, cam links disposed intermediate said bolster and support, tension links pivotally mounted to said support and the truck frame, a lever pivoted to a tension link and means comprising an angularly movable key for holding said lever in fixed position.

7. In a railway vehicle guide truck, the combination with a truck frame, of a movable support associated therewith, a swing bolster mounted on said support, cam links disposed intermediate said bolster and support, tension links pivotally mounted to said support and the truck frame, a lever pivoted to a tension link and means comprising a fluid-pressure-actuated key for holding said lever in fixed position.

8. In a railway vehicle guide truck, the combination with a plurality of swing links, of a locking device comprising a plurality of fluid-pressure-actuated piston members, a lever connecting certain of said links, a key mounted for pivotal and sliding movement in said lever, and means for connecting said key to said piston members.

9. In a railway vehicle guide truck, the combination with a plurality of swing links, of a locking device comprising a plurality of fluid-pressure-actuated piston members, a lever connecting certain of said links, a key mounted for pivotal and sliding movement in said lever, means for connecting said key with said piston members, and means for biasing said key in an open position.

In testimony whereof, I have hereunto subscribed my name this 28th day of September, 1925.

HAROLD A. HOUSTON.